United States Patent [19]

Arai et al.

[11] Patent Number: 5,231,871

[45] Date of Patent: Aug. 3, 1993

[54] HOT-ELECTRICAL-RESISTANCE TYPE GAS FLOW METER AND INTERVAL COMBUSTION ENGINE WITH HOT-ELECTRICAL-RESISTANCE TYPE GAS FLOW METER

[75] Inventors: Nobukatsu Arai, Ushiku; Kaoru Uchiyama, Ibaraki; Toshifumi Usui; Shinya Igarashi, both of Katsuta, all of Japan

[73] Assignees: Hitachi, Ltd., Tokyo; Hitachi Automotive Engineering Co., Ltd., Ibaraki, both of Japan

[21] Appl. No.: 664,297

[22] Filed: Mar. 4, 1991

[30] Foreign Application Priority Data

Mar. 2, 1990 [JP] Japan .................. 2-051255

[51] Int. Cl.$^5$ ................................. G01F 1/68
[52] U.S. Cl. ...................... 73/118.2; 73/202.5; 73/203
[58] Field of Search .............. 73/202, 202.5, 204.21, 73/118.2, 203

[56] References Cited

U.S. PATENT DOCUMENTS

| | | | |
|---|---|---|---|
| 2,591,195 | 4/1952 | Picciano | 73/202.5 |
| 3,688,576 | 9/1972 | Obermaier et al. | 73/202 |
| 3,769,835 | 11/1973 | Obermaier et al. | 73/202 |
| 4,445,368 | 5/1984 | Sumal | |
| 4,991,560 | 2/1991 | Arai et al. | 73/204.21 |

FOREIGN PATENT DOCUMENTS

| | | |
|---|---|---|
| 0082484B1 | 9/1988 | European Pat. Off. |
| 0322459A1 | 5/1989 | European Pat. Off. |
| 54-76182 | 6/1979 | Japan |
| 55-66716 | 5/1980 | Japan |
| 145321 | 10/1980 | Japan |
| 56-18721 | 2/1981 | Japan |
| 0055715 | 4/1983 | Japan ................. 73/202.5 |
| 51-90624 | 10/1984 | Japan |

Primary Examiner—Herbert Goldstein
Attorney, Agent, or Firm—Antonelli, Terry, Stout & Kraus

[57] ABSTRACT

An object of the present invention is to provide a hot-electrical-resistance type gas flow meter wherein a deterioration of a gas-cooled hot-electrical-resistance is prevented at the maximum flow rate, a decrease of sensitivity is prevented at the minimum flow rate and a wide dynamic range is achieve, and a structural feature of such gas flow meter is that the gas flow meter includes auxiliary path flow resistance changing means for changing a flow resistance of the auxiliary path so that the larger the flow rate of the flow is, the larger the flow resistance of the auxiliary path is.

11 Claims, 8 Drawing Sheets

HOT-ELECTRICAL-RESISTANCE TYPE GAS FLOW METER AND INTERVAL COMBUSTION ENGINE WITH HOT-ELECTRICAL-RESISTANCE TYPE GAS FLOW METER

BACKGROUND OF THE INVENTION AND RELATED ART STATEMENT

The present invention relates to measuring the flow rate of intake gas, particularly to a gas-cooled hot-electrical-resistance type gas flow meter which is mounted in an intake line to measure the flow rate of the intake gas by detecting a variation in electrical resistance value of a hot electrical resistance which is cooled by the intake gas.

In ordinary automobiles, the minimum mass flow rate $Qi$ is 10 to 15 Kg/h during idling of the engine and the maximum mass flow rate $Qm$ is 500 to 600 Kg/h on a critical rotational speed of the engine when a displacement of the engine is 4000 c.c.; while the minimum mass flow rate $Qi$ is 5 to 10 Kg/h on idling of the engine and the maximum mass flow rate $Qm$ is 300 to 400 Kg/h on the critical rotational speed of the engine when the displacement of the engine is 2000 c.c.. Therefore, the ratio of the maximum mass flow rate to the minimum mass flow rate (a dynamic range) $Qm/Qi$ is 60 to 80. In the future, the maximum mass flow rate will be increased for purposes of making the rotational speed and output power of the mobile engine higher, while the minimum mass flow rate will be kept at the present level, so that the dynamic range will reach 150.

The flow speed of intake air in an intake line, that is, the flow speed thereof at a gas-cooled hot-electrical-resistance type gas flow meter depends on the cross-sectional area of the main passage (the diameter of the intake line) and so forth and is limited within 0.5 m/s to 50 m/s over a whole range of the flow rate at the present time. The reason for restraining a further increase of the flow speed is that the higher the flow speed of intake air is, the larger will be deterioration (change in characteristics) by extremely small dust which cannot be filtered off by air cleaner, which dust sticks on the gas-cooled hot-electrical-resistance device with the passage of time, as explained on page 26 and FIG. 15 in SAE Paper 840137, 1984. An increase of the dynamic range, that is, an increase of the maximum flow rate causes an increase of the maximum flow speed and accelerates the sticking of the dust on the gas-cooled hot-electrical-resistance.

In a conventional hot-wire type gas flow meter as shown in Publication of Japanese Patent Application Laid-open No. Shou 54-76182, the temperature of the hot wire is increased to more than the normal operational temperature thereof so that the dust on the hot wire is burned out and the cleanliness of the hot wire is maintained. But, since the dust includes calcium, the dust sticks securely on the hot wire even with the temperature increase of the hot wire and the deterioration of the characteristics thereof is made large. In another conventional hot-wire type gas flow meter as shown in Publication of Japanese Patent Application Laid-open No. Shou 59-190624, an obstacle is arranged at an upstream side of the hot wire so that the dust sticks on the obstacle and the dust is prevented from sticking on the hot wire. But, since the flow speed of air at the hot wire is decreased by the obstacle, the sensitivity of the hot wire is decreased when the flow rate of intake air is low. And, since the obstacle generates a disturbance or eddy in the intake air, the output noise of the hot wire is increased.

In another conventional hot-wire type gas flow meter as shown in Publication of Japanese Patent Application Laid-open No. Shou 55-66716, a straight tube receiving the hot wire is arranged in a main passage. In this structure, the flow speed in the tube (on the hot wire) is substantially equal to the flow speed in the main passage surrounding the tube. Therefore, in order to keep the maximum flow speed within a desirable degree when the maximum flow rate of intake air is increased, the cross-sectional area, that is, the diameter of the passage must be increased with an increase in space receiving a duct system. And, in this case, since the minimum flow rate of intake air is not increased, the flow speed is decreased to less than a desirable degree so that the sensitivity of the hot wire is decreased and noise protection is needed.

In another conventional hot-wire type gas flow meter as shown in Publication of Japanese Patent Application Laid-open No. Shou 56-18721, a bypass passage is formed independently from a main passage. In this case, a flow speed of intake air in the bypass passage is made different from a flow speed in the main passage by adjusting (increasing) the flow resistance of the bypass passage. Therefore, when the maximum flow rate is increased, the maximum flow speed in the bypass passage can be kept less than a desirable degree without increasing the size of the body forming the passages. But, in this structure, since the flow speed in the bypass passage is in proportion to the flow speed in the main passage, the flow speed in the bypass passage is decreased to less than a desirable degree when the flow speed in the main passage is decreased, so that the sensitivity of the hot wire is decreased and the generated noise (a small disorder in flow) is large in comparison with the overall flow.

In another conventional hot-wire type gas flow meter as shown in Publication of Japanese Utility Model Application Laid-open No. Shou 55-145321, a valve device is arranged in a bypass passage to control the flow resistance of the bypass passage for changing the flow rate of intake air. In this structure, the cross-sectional area of the bypass passage is increased to decrease the flow resistance characteristic so that the flow speed at a sensor portion (a hot wire) is increased when the flow rate is increased. This operation in this structure is opposite to an operation in the present invention. This operation is effective for compensating a variation in rate of an output voltage of the sensor to a flow speed at the sensor, because the output voltage of the sensor is in proportion to a square root of the flow speed at the sensor and the higher the flow rate is, the smaller is the rate of the output voltage of the sensor to the flow speed at the sensor.

In the conventional hot-wire type gas flow meters, a deterioration of the hot wire cannot be restrained when the maximum flow rate of intake air to be measured is large, and a suitable flow speed for preventing a decrease in sensitivity of the hot wire at the minimum flow rate cannot be obtained.

OBJECT AND SUMMARY OF THE INVENTION

An object of the present invention is to provide a gas-cooled hot-electrical-resistance type gas flow meter wherein a deterioration of a gas-cooled hot-electrical-resistance is prevented at the maximum flow rate, a decrease of sensitivity is prevented at the minimum flow rate and a wide dynamic range (measured range of flow rate) is achieved.

Another object of the present invention is to provide a high speed and high output internal combustion engine wherein an optimum rate of intake air to fuel is achieved both at an idling time of the engine and at a maximum output time thereof.

According to the present invention, a hot-electrical-resistance type gas flow meter comprises a primary flow passage through which a main part of an intake gas passes, an auxiliary flow passage through which a part of the intake gas passes, and a hot-electrical-resistance which is received by the auxiliary flow passage and through which a flow rate of the intake gas is measured by detecting a variation in electrical resistance value of the hot electrical resistance which is cooled by the part of the intake gas, wherein the hot-electrical-resistance type gas flow meter further comprises variable means for changing the flow resistance of the auxiliary flow passage in accordance with the flow rate of the intake gas so that the larger the flow rate of the intake gas is, the larger the flow resistance of the auxiliary flow passage is.

According to the present invention, an internal combustion engine comprises the above mentioned gas-cooled hot-electrical-resistance type gas flow meter, speed measuring means for measuring the rotational speed of the engine, injection device for injecting fuel into the intake gas, control means for calculating a suitable amount of fuel injected by the injection device from the measured rotational speed of the engine and from the measured flow rate of the intake gas and for controlling the injection device to inject the suitable amount of fuel.

Since the hot-electrical-resistance type gas flow meter according to the present invention comprises the variable means for changing the flow resistance of the auxiliary flow passage in accordance with the flow rate of the intake gas so that the larger the flow rate of the intake gas is, the larger the flow resistance of the auxiliary flow passage is, the flow rate of the intake gas in the auxiliary flow passage is in proportion to the flow rate of the intake gas in the primary flow passage and a dynamic range of the intake gas in the auxiliary flow passage is smaller than a dynamic range of the intake gas in the main flow passage. Therefore, the flow rate of the intake gas in the auxiliary flow passage is kept small even when the flow rate of the intake gas in the primary flow passage is large, so that a deterioration of the hot-electrical-resistance is prevented. Further, the flow rate of the intake gas in the auxiliary flow passage may be large when the flow rate of the intake gas in the primary flow passage is small, so that a sensitivity of the variation in electrical resistance value of the hot electrical resistance is sufficiently large to maintain a high accuracy of the flow meter.

DETAILED DESCRIPTION OF PREFERRED EMBODIMENTS

Figure 1:
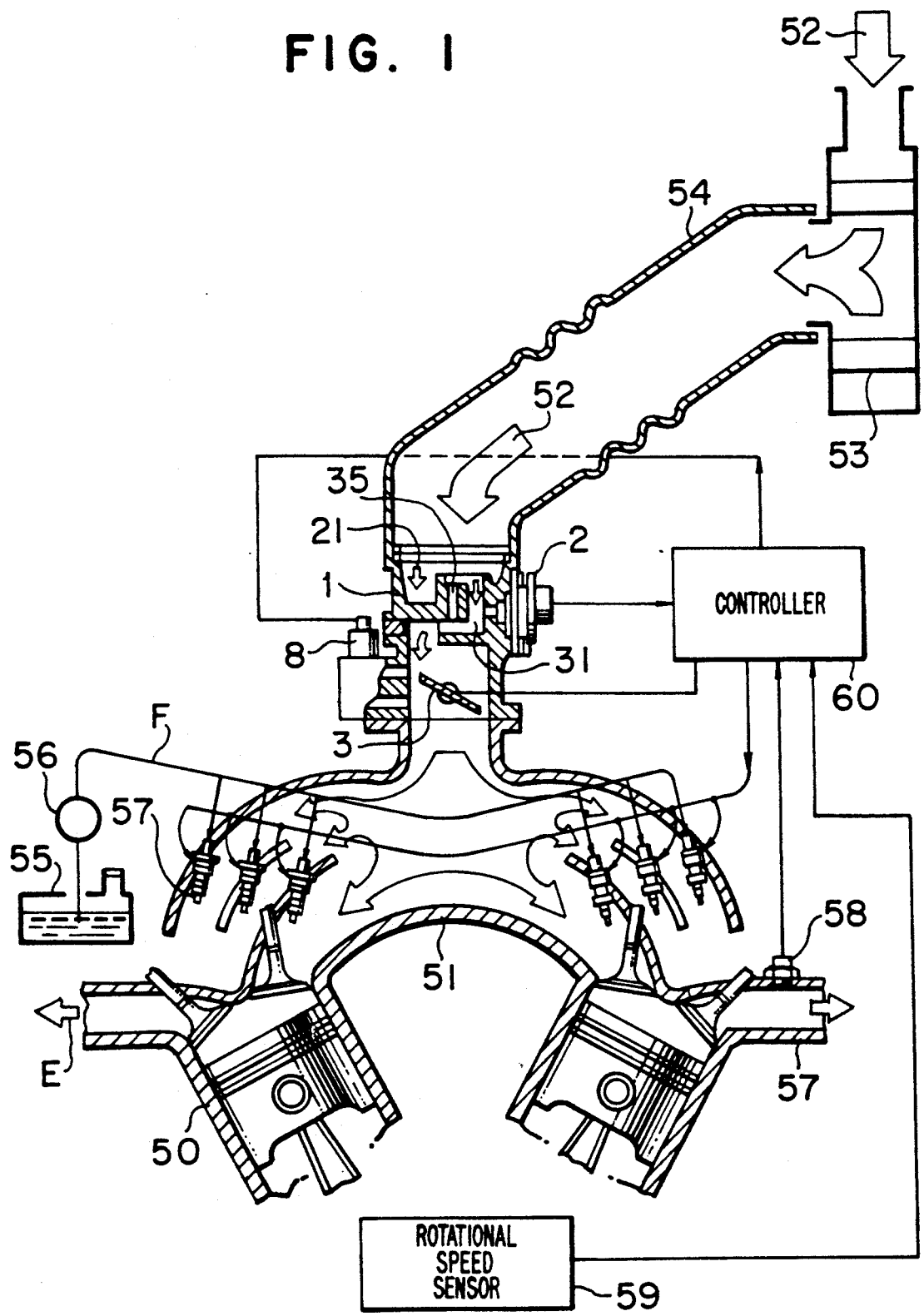
FIG. 1 is a cross-sectional view showing an internal combustion engine with a gas-cooled hot-electrical-resistance type gas flow meter according to the present invention.
Figure 2:
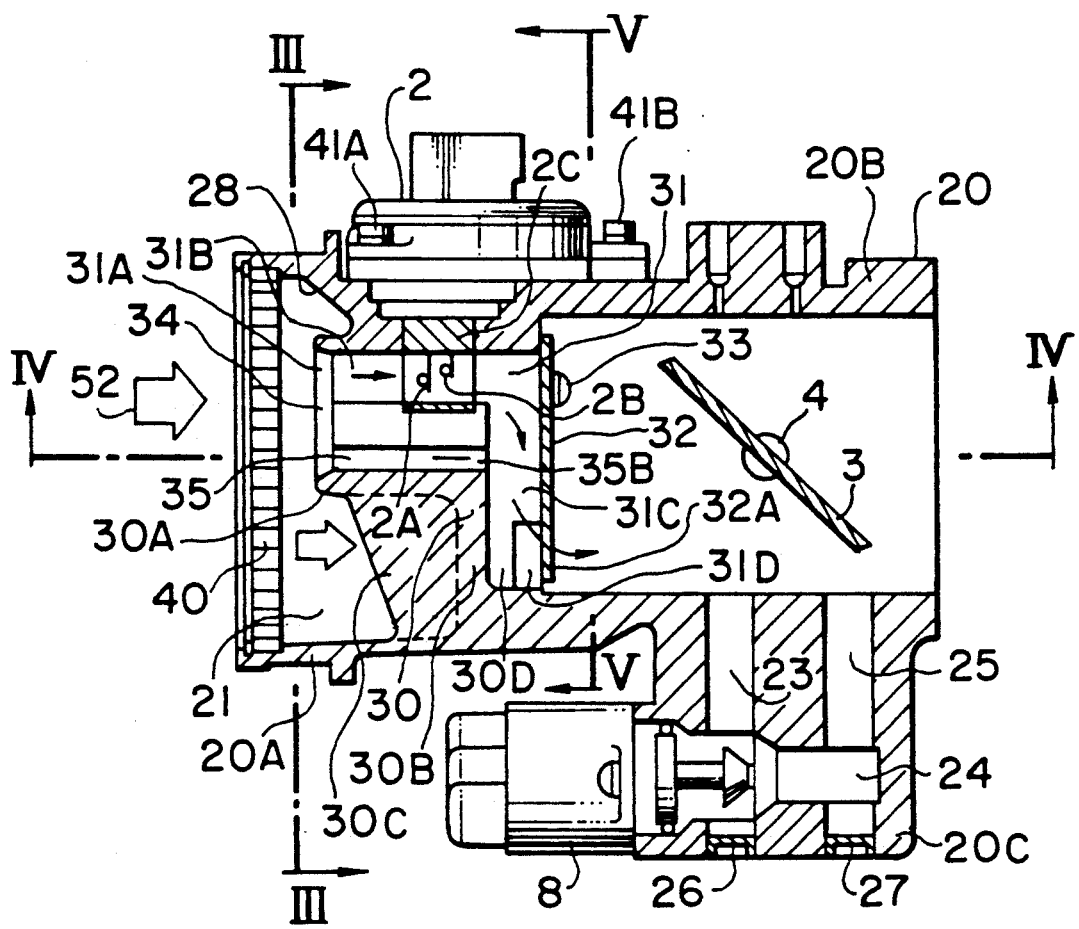
FIG. 2 is a cross-sectional view showing an embodiment of the present invention.
Figure 3:
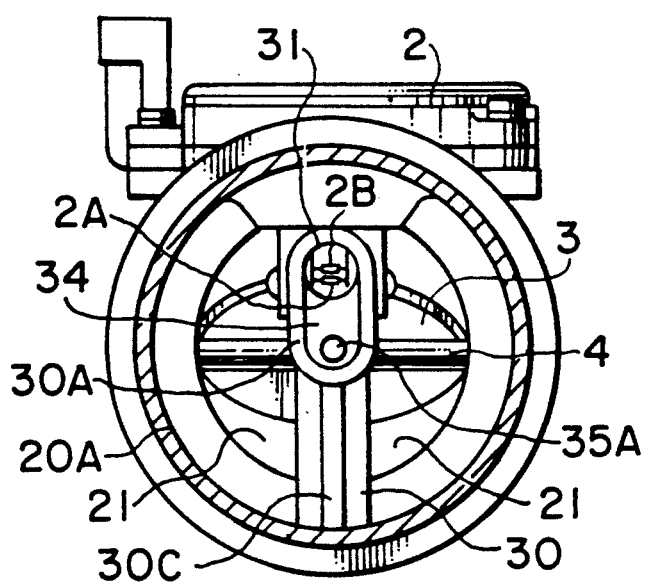
FIG. 3 is a cross-sectional view taken along a line III—III of FIG. 2.
Figure 4:
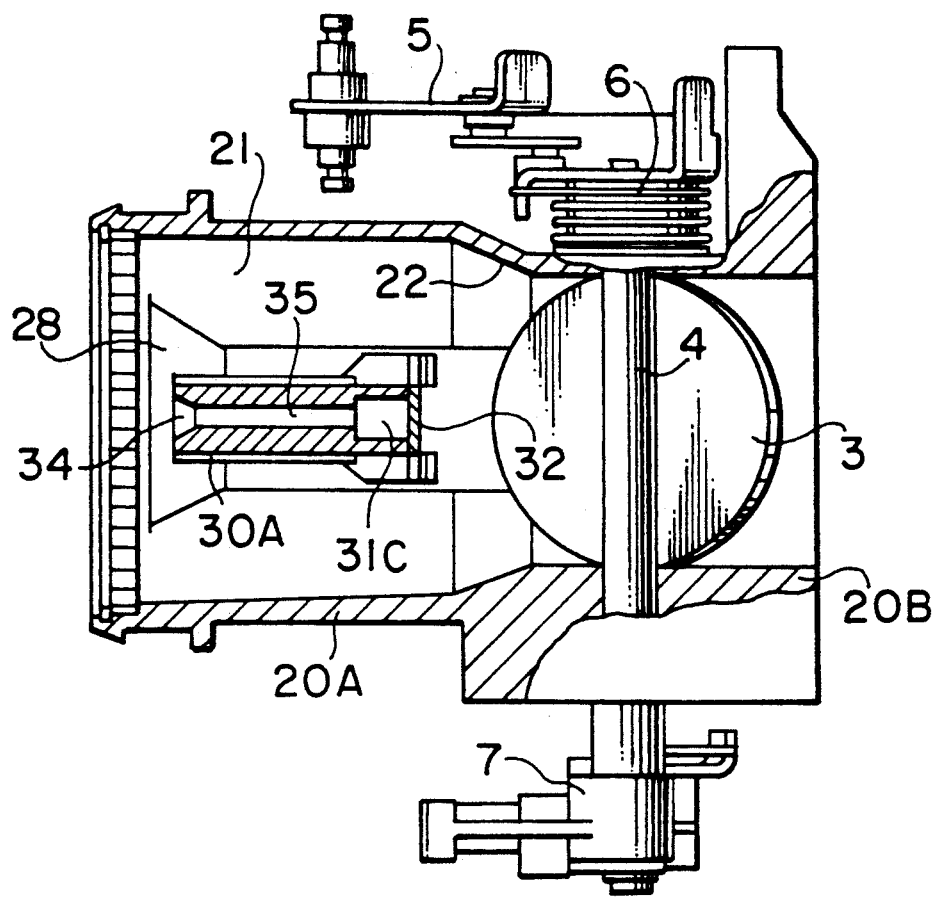
FIG. 4 is a cross-sectional view taken along a line IV—IV of FIG. 2.
Figure 5:
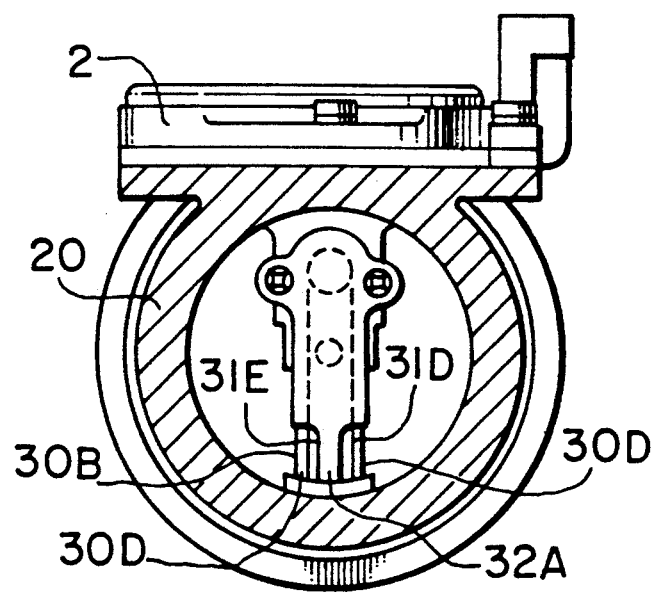
FIG. 5 is a cross-sectional view taken along a line V—V of FIG. 2

FIG. 1 shows an internal combustion engine with an electrically controlled fuel injection device and a hot-electrical-resistance type gas flow meter according to the present invention.

Intake air 52 is supplied to the internal combustion engine (cylinder) 50 through an air-filter 53, an intake duct 54, a flow meter (the gas-cooled hot-electrical-resistance type gas flow meter) 1 and an intake manifold 51. The flow meter 1 includes a primary path 21, a first auxiliary path 31 and a second auxiliary path 35. A main part of the intake air 52 flows through the primary path 21, and the other part of the intake air 52 flows through the first auxiliary path 31 and the second auxiliary path 35. The first auxiliary path 31 has positioned therein an electrical resistance device 2A and temperature variation compensating device 2B integrally connected to a circuit unit 2. The electrical resistance device 2A measures air flow rate to generate through the circuit unit 2 an output signal corresponding to the overall whole flow rate of the intake air 52. At a down-stream side of the electrical resistance device 2A in the flow meter 1, there is arranged a throttle valve 3 connected to an accelerator pedal for controlling the flow rate of the intake air 52 and an idling speed control (ISC) valve 8 for controlling the flow rate of the intake air 52 when the throttle valve 3 completely prevents a flow of the intake air 52 (idling time).

Fuel F is injected by a pump 56 from a fuel tank 55 through an injector 57 into an intake manifold 51 so that the fuel F is supplied to the internal combustion engine 50 with the intake air. The exhaust gas is discharged as shown by an arrow E. A control device 60 calculates a fuel injecting rate and an opening degree of the ISC valve 8 on the basis of the output signal of the circuit unit 2, a rotational degree of the throttle valve 3, an output signal of an oxygen density sensor 58 mounted on the intake manifold 57 and an output signal of an engine rotational speed sensor 59. And, the control device 60 controls the injector 57 and the ISC valve 8 on the basis of these calculations.

In FIGS. 2 to 5, a body 20 includes a flow meter body 20A, a throttle valve body 20B and an ISC valve body 20C. A lattice member (honeycomb) 40 for regulating the flow is arranged at an inlet of the flow meter body 20A. A block (bridge) 30 forming the first auxiliary path 31 and the second auxiliary path 35 extends from the flow meter body 20A into the primary passage 21 at a downstream side of the lattice member 40. The first auxiliary path 31 includes an axial path 31B extending substantially parallel to the primary passage 21. The sensor circuit unit 2 is fixed to the flow meter body 20A by screws 41a and 41B and a mold portion 2C extends from the sensor circuit unit 2 into the axial path 31B. The mold portion 2C has a hole whose diameter is substantially equal to a diameter of the axial path 31B, which forms a part of the axial path 31B, and by which the electrical resistance device 2A and temperature variation compensating device 2B are received.

The throttle valve body 20B receives the throttle valve 3 for controlling the flow rate of intake air, and a valve shaft 4 extends through the throttle valve body 20B. A lever mechanism 5 for driving the valve shaft 4, a spring 6 and a throttle position sensor 7 for measuring a rotational angle of the valve shaft 4 are connected to the shaft 4 at the outside of the throttle valve body 20B. The ISC valve 8 for controlling the flow rate of intake air when the throttle valve 3 blocks the flow of the intake air during idling time of the engine and air paths 23, 24 and 25 for the ISC valve 8 are arranged in the ISC valve body 20C. Plugs 26 and 27 close ends of the paths 23 and 25 so that the paths 23 and 25 do not communicate with the outside of the ISC valve body 20C.

The first auxiliary path 31 includes the axial path 31B, whose inner diameter is smaller, than the inner diameter of the primary path and has a round shape, and a radial path 31C which extends perpendicularly from a downstream side of the axial path 31B and whose cross-sectional shape is square. The radial path 31C is formed by a groove arranged at a downstream side of the block 30 and by a cover 32 fixed to the block 30 by screws 33. A lower end portion 32A of the cover 32 has a width smaller than the width of the groove of the radial path 31C and extends over a flow-out portion 31D of the auxiliary path. A flow resistance formed by a L-shaped passage line and friction of the auxiliary path 31 is larger than a flow resistance of the primary path 21. Since most of an outer wall of the block 30 is cooled by main flow of the intake air, the temperature of the path wall of axial path 31B is substantially equal to that of the intake air so that heat from the outside is cooled by the intake air to maintain the accuracy of measuring the flow rate. And since the lower end portion 32A of the cover 32 extends over the flow-out portion 31D, a reverse flow into the radial path 31C, for example, a backfire of the internal combustion engine, is prevented to protect the hot wire device 2A. And, since the flow resistance absorbs an oscillating variation in flow rate of the intake air, the output of the hot wire device 2A is stabilized.

An elliptic recess 34 is formed by an edge 30A slightly projecting around an inlet opening 31A of the first auxiliary flow path 31 toward an upperstream portion. In this embodiment, the inlet opening 31A of the first auxiliary flow path 31 opens at a bottom of the recess 34 and at an upper side of FIG. 2, that is, a side wherein the sensor unit 2 is arranged. A side portion of the recess 34 other than the inlet opening 31A extends substantially to a center of the primary path. Since the recess 34 is arranged in this way, an oscillating variation in flow rate caused by an air-cleaner and a bent intake duct arranged at an upperstream portion of the path 31 is absorbed to stabilize a division of flow rate to the first auxiliary path 31.

At least one second auxiliary path 35 with a small diameter has an inlet opening 35A at an radially inner part of the bottom of the recess 34 in the primary path 21 and extends substantially parallel to the axial path 31B of the first auxiliary path 31. An outlet opening 35B of the second auxiliary path 35 is arranged at the radial path 35C of the first auxiliary path 31. Flow rates of the first auxiliary path 31 and the second auxiliary path 35 vary in accordance with the total flow rate of the intake air. Since the flow in the second auxiliary path 35 is added into the flow of the first auxiliary path 31 at the radial path 31C, an effective area of flow of the first auxiliary path 31 is decreased, that is, the flow resistance thereof is increased in accordance with an increase of the total flow rate of the intake air. Therefore, an increasing characteristic of the flow rate of the first auxiliary path 31 having the hot-electrical-resistance device 2A and the temperature compensating device 2B is smaller than that of the total flow rate.

Figure 6:
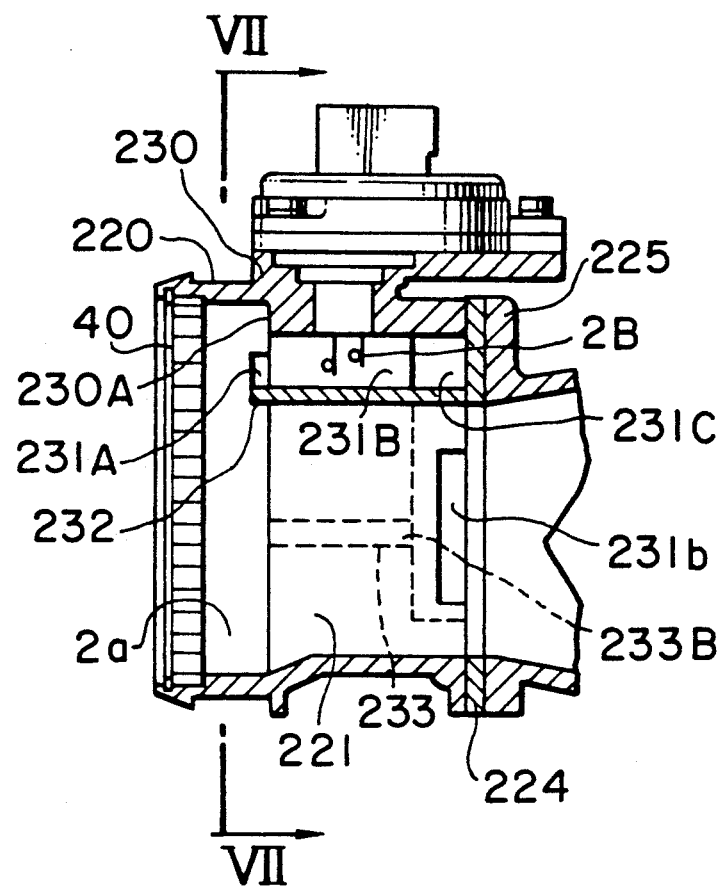
FIG. 6 is a cross-sectional view showing another embodiment of the present invention.
Figure 7:
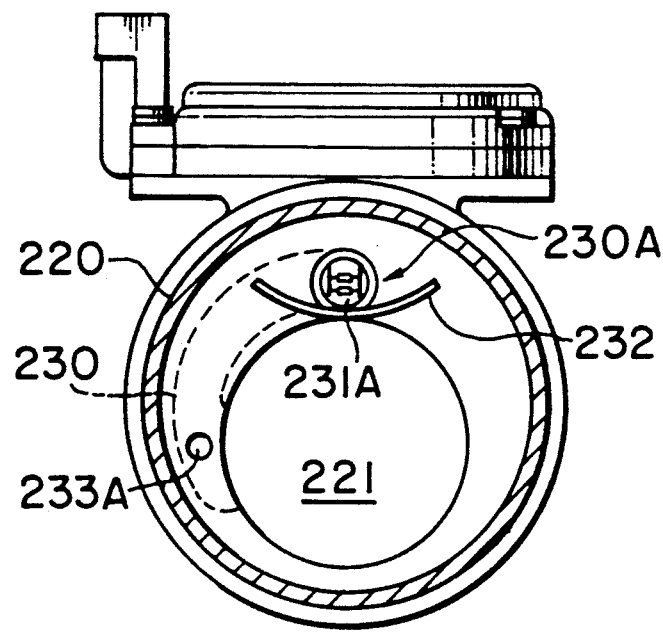
FIG. 7 is a cross-sectional view taken along a line VII—VII of FIG. 6.

In an embodiment shown in FIGS. 6 and 7, a large thickness portion 230 of a body 220 receives a first auxiliary path 231 including an axial path 231B extending parallel to a primary path 221 and a loop-shaped path 231C bypassing the primary path 221 at an outer periphery thereof. An outlet opening 231D of the first auxiliary path 231 opens to an inner wall of the primary path 221. A tube path body 225 at a downstream side is connected to the body 220 through a packing 224. An upperstream end surface of the large thickness portion 230 of the body 220 forms a plane 230A extending perpendicularly to the flow. An inlet opening 231A of the first auxiliary path 231 opens to the plane 230A. A circular edge 232 projecting toward an upperstream portion is arranged between the inlet opening 231A and the primary path 221. The edge 232 prevents the intake gas remaining on the plane 230A from flowing out to the primary path 221, so that a static pressure at the inlet opening 231A is stabilized. Therefore, a division in flow rate between the first auxiliary path 231 and the primary path 221 is stabilized against a variation of flow at the upperstream portion.

At least one second auxiliary path 233 extends substantially parallel to the axial path 231B of the first auxiliary path 231. An inlet opening 233A of the second auxiliary path 233 is arranged on the plane 230A and an outlet opening 233B is arranged inside of the loop-shaped path (path extending in a direction crossing an axis of the primary path) 231C of the first auxiliary path 231. Therefore, the second auxiliary path 233 operates as the auxiliary path 35 above mentioned, and an increasing characteristic of the flow rate of the first auxiliary path 231 is smaller than that of the total flow rate.

Figure 8:
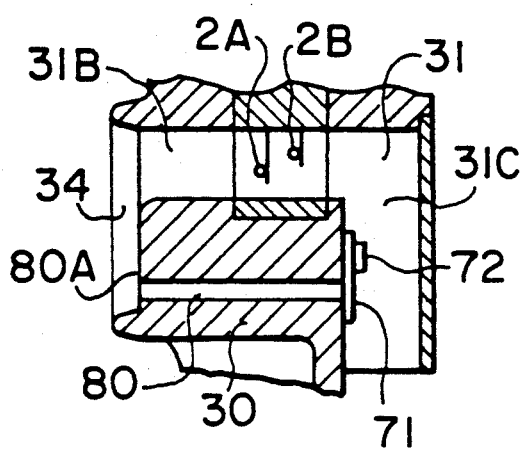
FIG. 8 is a cross-sectional view showing another embodiment of the present invention on a small flow rate.
Figure 9:
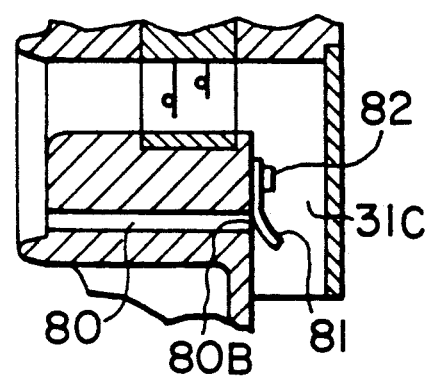
FIG. 9 is a cross-sectional view showing the embodiment of FIG. 8 on a large flow rate.

In an embodiment shown in FIGS. 8 and 9 wherein a modification of the embodiment shown in FIGS. 2 to 5 is shown, at least one second auxiliary path 80 extends substantially parallel to the axial path 31B of the first auxiliary path 31. An inlet opening 80A of the second auxiliary path 80 is arranged at the recess 34 and an outlet opening 80B is arranged in the radial path 31C of the first auxiliary path 31. At least one flexible plate or spring plate 81 is arranged at the outlet opening 80B so that the outlet opening 80B is closed when the flow rate in the second auxiliary path 80 is small. The flexible plate 80 is fixed at an end thereof and deforms in the radial path 31C as shown in FIG. 9 when a pressure difference between upperstream and downstream sides of the second auxiliary path 80 is large, that is, a flow rate therein is large. Therefore, a cross-sectional area of the radial path 31C is decreased by the flexible plate 81 and the effective area of flow of the radial path 31C is decreased by the addition of the flow of the second auxiliary path 80 to that of the first auxiliary path 31 so that the flow resistance of the first auxiliary path 31 is increased and the increasing characteristic of the flow rate of the first auxiliary path 31 is smaller than that of the total flow rate.

Figure 10:
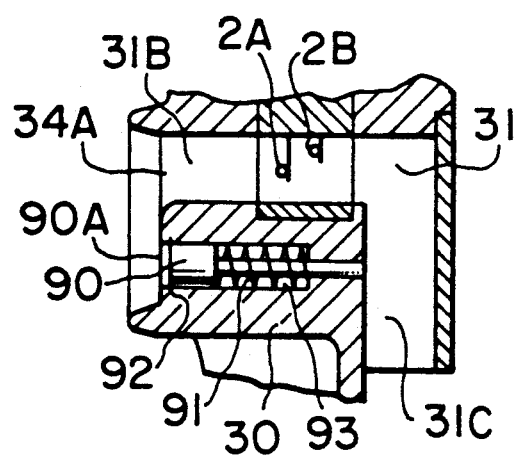
FIG. 10 is a cross-sectional view showing another embodiment of the present invention on a small flow rate.
Figure 11:
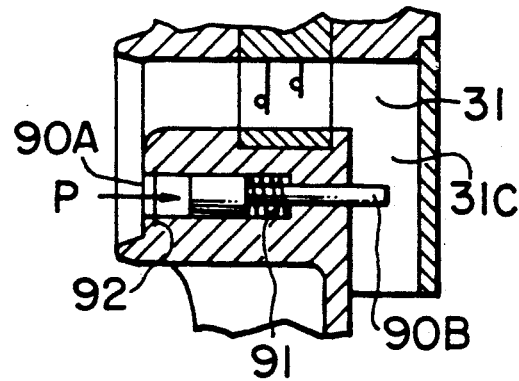
FIG. 11 is a cross-sectional view showing the embodiment of FIG. 10 on a large flow rate.

In an embodiment shown in FIGS. 10 and 11 wherein a modification of the embodiment shown in FIGS. 2 to 5 is shown, at least one step-shaped hole (second auxiliary path) 93 extends substantially parallel to the axial path 31B and receives at least one step-shaped piston 90 including a longitudinal end facing to the upperstream side to be pressed toward the downstream side by the pressure difference therebetween and at least one spring member 91 pressing the piston 90 toward the upperstream side. An upperstream end of the step-shaped hole 93 opens to the recess 34 at an inlet thereof, and a stop ring 92 arranged at an inlet opening 90A prevents the piston 90 from moving out from the step-shaped hole 93. A downstream end of the step-shaped hole 93 opens to the inside of the radial path 31C so that another longitudinal end of the piston 90 can move into the radial path 31C. The piston 90 is moved by a pressure difference between the longitudinal upperstream side and downstream side ends thereof against the force of the spring member 91 so that the longitudinal end of the piston 90 projects into the radial path 31C to decrease the cross-sectional area of the radial path 31C as shown in FIG. 11, when the flow rate is large. The more the flow rate is large, the more the piston 90 projects into the radial path 31C so that the more the flow rate is large, the more the flow resistance in the auxiliary path 31 is large.

Figure 12:
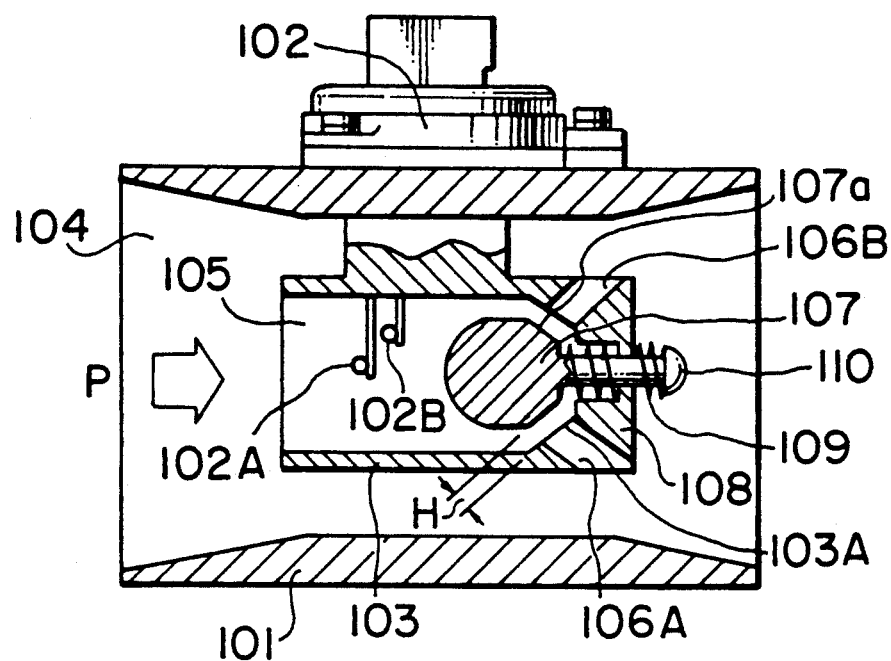
FIG. 12 is a cross-sectional view showing another embodiment of the present invention.

An embodiment shown in FIG. 12 includes a body 101 receiving a part of an intake path, a sensor unit 102 and a tube member 103 receiving a auxiliary path 105 arranged at a substantially central portion of a primary path 104. A hot electrical resistance device 102A and a temperature compensating device 102B are arranged in the auxiliary path 105. A plurality of outlet openings 106A and 106B of the auxiliary path 105 extend radially from an inlet surface 103A having a conical shape. A piston 107 having also a conical surface 107A is arranged on the inlet surface 103A and is urged by springs 108 and 109. A downstream end 110 of the piston 107 limits the movement thereof. When the flow rate or speed in the auxiliary path 105 is large, an upperstream end of the piston 107 receives a large pushing force generated by the mass of the intake gas running onto the upperstream end in the auxiliary path 105 at a large speed so that the piston 107 moves toward the downstream end and decreases a clearance H between the conical surfaces to increase the flow resistance of the auxiliary path 105. When the flow rate in the auxiliary path 105 is small, the piston is moved toward the upperstream end by the spring force so that the flow resistance of the auxiliary path 105 is decreased.

Figure 13:
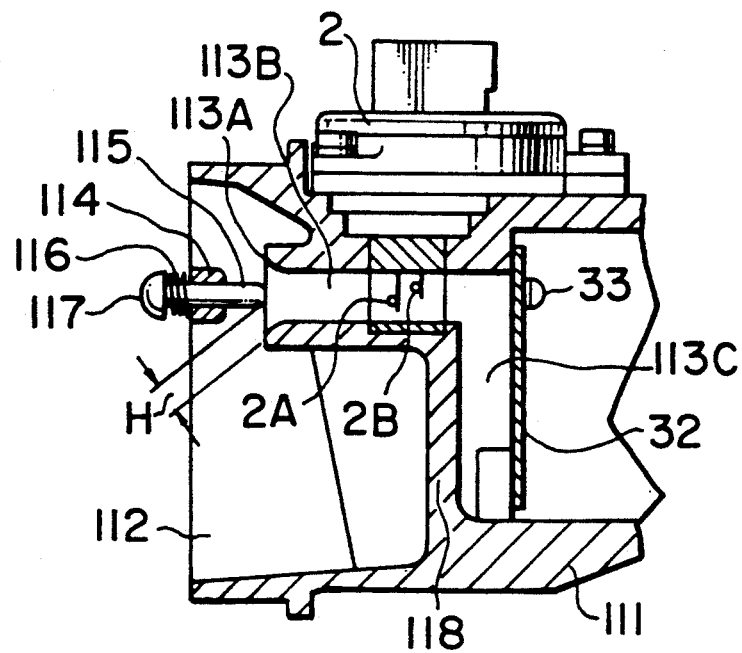
FIG. 13 is a cross-sectional view showing the other embodiments of the present invention.

In an embodiment shown in FIG. 13, a bridge 118 extends transversely in a primary path 112 formed in a body 111 and includes an auxiliary path 113 having an axial path 113B and a radial path 113C. A piston 115 is supported by a rib member 114 integrally formed with the body 111 and is arranged at an upperstream side of an inlet portion of the auxiliary path 113. A spring 116 is arranged between the rib member 114 and a stopper 117 of the piston 115. An inlet opening 113A of the auxiliary path 113 has a large conical surface, and a movement of the piston 115 changes the clearance H between the inlet opening 113A and the piston 115. When the flow rate or speed in the auxiliary path 113 is large, an upperstream end surface of the stopper 117 of the piston 115 receives a large pushing force generated by a mass of the intake gas running onto the upperstream end surface in the auxiliary path 113 at a large speed so that the piston 115 moves toward the downstream side and decreases the clearance H to increase the flow resistance of the auxiliary path 113. When the flow rate in the auxiliary path 113 is small, the piston 115 is moved toward the upperstream side by the spring force so that the flow resistance of the auxiliary path 113 is decreased.

Figure 14:
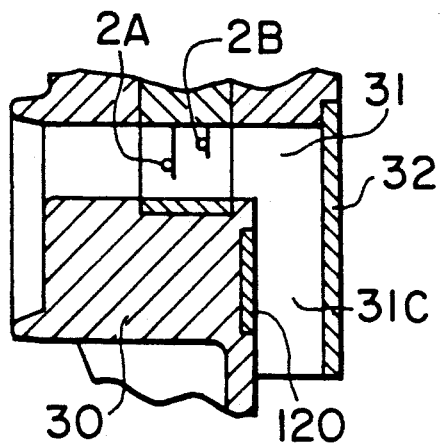
FIGS. 14 and 15 are cross-sectional views showing the other embodiments of the present invention, respectively.
Figure 15:
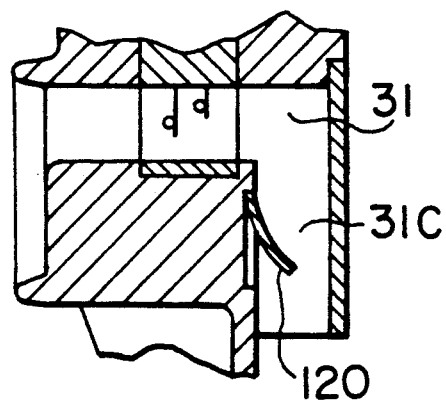

In an embodiment shown in FIGS. 14 and 15 wherein a modification of the embodiment shown in FIGS. 2 to 5 is shown, the second auxiliary path is deleted. A thermo-responsive deform member 120, for example, a bimetal or shape memory alloy is arranged on a surface of the bridge 30 in the radial path 31C. The thermo-responsive deform member 120 deforms in accordance with a variation in temperature thereof and a constant electric current is supplied to the thermo-responsive deform member 120 to heat it. When the flow rate in the radial path 31C is small and a cooling for the thermo-responsive deform member 120 is weak, the thermo-responsive deform member 120 keeps a flat shape so that the flow resistance of the auxiliary path 31 is small. When the flow rate in the radial path 31C is large and the cooling for the thermo-responsive deform member 120 is strong to decrease largely the temperature of the thermo-responsive deform member 120, the thermo-responsive deform member 120 deforms to decrease the cross-sectional area of the radial path 31C as shown in FIG. 15 so that the flow resistance of the auxiliary path 31 is large.

Figure 16:
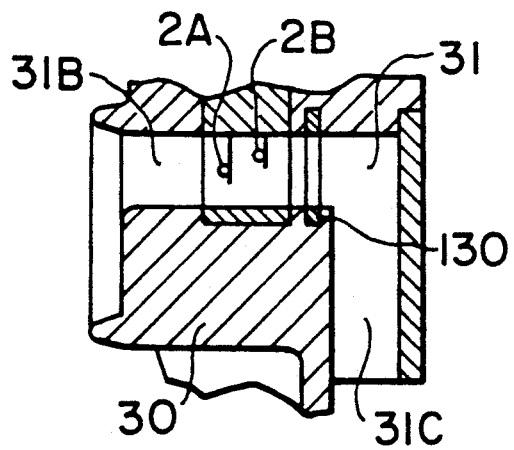
FIGS. 16 and 17 are a cross-sectional view showing another embodiment of the present invention.
Figure 17:
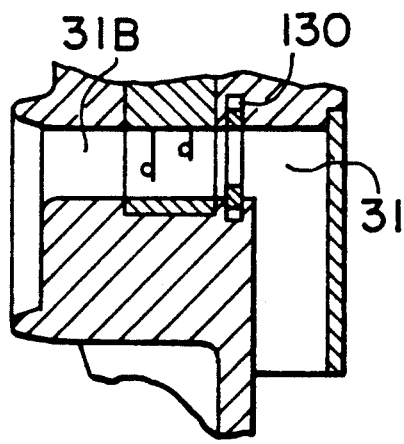

In an embodiment shown in FIGS. 16 and 17 wherein a modification of the embodiment shown in FIGS. 2 to 5 is shown, the second auxiliary path is deleted. At least one thermo-responsive deform ring 130 made of, for example, a shape memory alloy is arranged at the downstream side of the hot electrical-resistance device 2A and the temperature compensating device 2B in the axial path 31B. An inner diameter of a hole of the thermo-responsive deform ring 130 changes in accordance with a variation in temperature thereof and a constant electric current is supplied to the thermo-responsive deform member 130 to heat it. When the flow rate in the axial path 31B is small and the cooling for the thermo-responsive deform member 130 is weak, the thermo-responsive deform ring 120 keeps the diameter of the hole thereof equal to the diameter of the axial path 31B so that the flow resistance of the auxiliary path 31 is small. When the flow rate in the axial path 31B is large and the cooling for the thermo-responsive deform ring 130 is strong to decrease largely the temperature of the thermo-responsive deform ring 130, the thermo-responsive deform ring 120 deforms to decrease the diameter of the hole thereof as shown in FIG. 17 so that the flow resistance of the auxiliary path 31 is large.

In the embodiments using the thermo-responsive deform members 120 or 130, the electric current may be changed to control the movement of the thermo-responsive deform members 120 or 130 in accordance with the flow rate in the auxiliary path so that the larger the flow rate in the auxiliary path is, the larger the flow resistance of the auxiliary path is.

Any of the above mentioned embodiments may be applied to an internal combustion engine or fuel injector for the internal combustion engine, as shown in FIG. 1.

Figure 18:
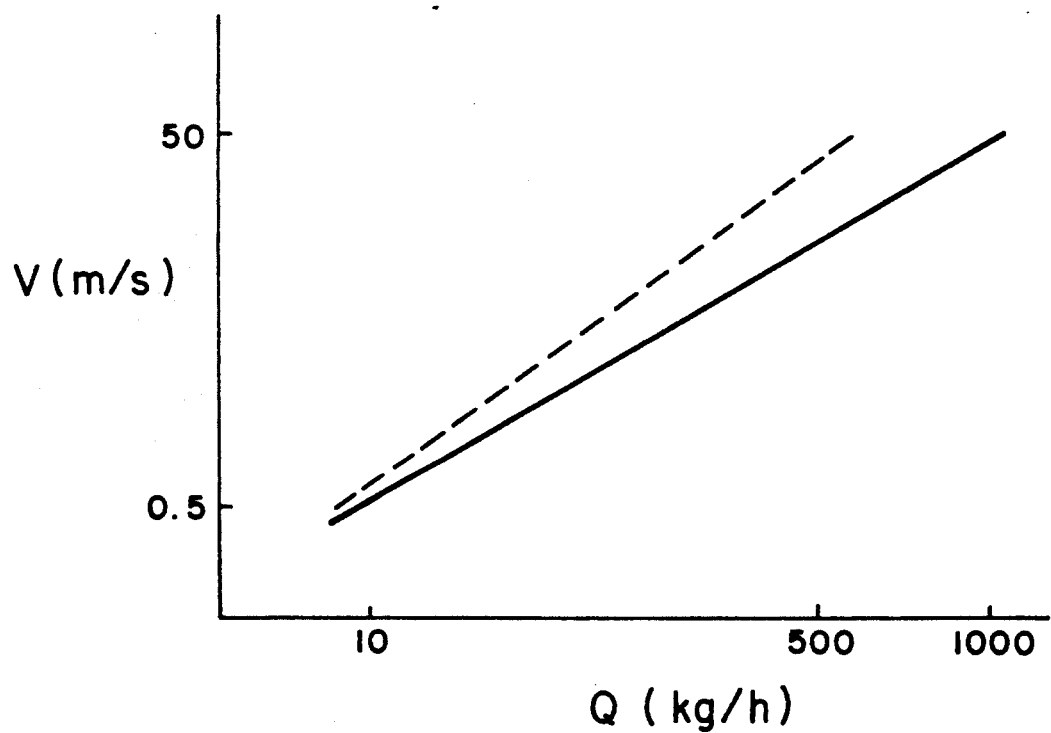
FIG. 18 is a diagram showing relations between flow speeds at a sensing portion and measured flow rates, in the prior art and the present invention.

According to the present invention, as shown in FIG. 18, a measurable range of the flow rate of the intake gas is larger than that of the prior art when the ranges of flow rate on the hot-electrical-resistance device and the diameters of the main passages are even therebetween respectively. The X logarithmic coordinate indicates a total flow rate Q and the Y logarithmic coordinate indicates a flow speed on the hot-electrical-resistance device. A dot-line indicates a relation therebetween according to the prior art, and a solid line indicates a relation therebetween according to the present invention. The dynamic range according to the prior art is 60 to 80; on the other hand, the dynamic range according to the present invention is 120 to 150.

What is claimed is:

1. An electrical-resistance type air flow meter for measuring a flow of air passing therethrough, comprising:
   a primary flow path for passing a substantial part of said flow of air;
   a first auxiliary flow path for passing another part said flow of air;
   an electrical resistance device which is disposed in said first auxiliary flow path within said another part of said flow of air; and
   flow resistance changing means for increasing the passage resistance of the first auxiliary flow path according to an increase in the flow rate of said flow of air, including a second auxiliary flow path extending in parallel to said first auxiliary flow path for receiving a still further part of said flow of air.

2. An electrical-resistance type air flow meter according to claim 1, wherein said flow resistance changing means further includes a member which is moved in accordance with a variation in flow rate of the flow of air by air flowing into said second auxiliary flow path so that, when the flow rate of the flow is increased, the passage resistance of the first auxiliary flow path is increased.

3. An electrical-resistance type air flow meter according to claim 2, wherein the movable member is an elastic plate disposed over an end of said second auxiliary flow path, one end of which elastic plate is fixed and another end of which is subjected to dynamic pressure from air flowing into said second auxiliary flow path so as to be moved elastically in said first auxiliary flow path.

4. An electrical-resistance type air flow meter comprising:
   a body;
   a primary flow path formed in the body and constituting an intake air passage;
   an electrical resistance device for measuring intake air flow;
   an auxiliary flow path formed in the body and having mounted therein said electrical resistance device; and
   variable means for changing the path resistance of said auxiliary flow path in accordance with an amount of the intake air flow, including another auxiliary flow path extending substantially in parallel to said axial flow path and communicating at its outlet end with said auxiliary flow path.

5. A flow meter according to claim 4, wherein said auxiliary flow path includes an axial flow path extending in a direction of said primary flow path and a radial flow path extending in a radial direction of said primary flow path.

6. A flow meter according to claim 4, wherein said variable means further includes a flexible plate at an outlet opening of said another auxiliary flow path, said flexible plate changing a cross-sectional area of said radial flow path in accordance with a dynamic pressure of air flowing into said another auxiliary flow path.

7. A flow meter according to claim 4, wherein said auxiliary flow path includes an axial flow path extending in an axial direction of said primary flow path and an annular flow path which crosses a downstream side of said axial flow path and extends along an inner periphery of the body.

8. A flow meter according to claim 7, wherein said another auxiliary flow path has an outlet end which communicates with said annular flow path.

9. An electrical-resistance type air flow meter comprising:
   a body;
   a primary flow path formed in the body for constituting an intake air passage;
   an electrical resistance device for measuring intake air;
   an auxiliary flow path formed in the body and having mounted therein said electrical resistance device; and
   variable means for changing a path resistance of said auxiliary flow path including, an additional auxiliary flow path formed in the body in parallel to said auxiliary flow path and means responsive to air flowing into said additional auxiliary flow path for controlling the passage area of said auxiliary flow path.

10. A flow meter according to claim 9, wherein said controlling means of said variable means is arranged at a downstream side of said electrical resistance device.

11. An internal combustion engine comprising:
    a hot-electrical-resistance type air flow meter having a body, a primary flow path formed in the body for constituting an intake air passage to conduct a portion of a flow of air, an electrical resistance device for measuring intake air, an auxiliary flow path formed in the body to conduct another portion of the flow of air and having mounted therein said electrical resistance device;
    variable means for changing the path resistance of said auxiliary flow path to said another portion of the flow of air in accordance with an amount of the flow of air, including a second auxiliary flow path operating to change said passage resistance of the first auxiliary flow path by passing a still further part of said flow of air to an end of the second auxiliary flow path which joins the first auxiliary flow path downstream of said electrical resistance device;

speed measuring means for measuring a rotational speed of the engine;

an injection device for injecting fuel into the intake air; and control means for calculating a suitable amount of fuel injected by said injection device from the measured rotational speed of the engine and from the measured flow rate of the intake air and for controlling said injection device to inject a suitable amount of fuel.

* * * * *